United States Patent
Lazar et al.

(12)

(10) Patent No.: US 12,438,809 B2
(45) Date of Patent: Oct. 7, 2025

(54) DISTRIBUTED DATA STORAGE SYSTEM WITH TUNNELING OF MANAGEMENT REQUESTS AMONG SCALE-OUT CLUSTERS

(71) Applicant: Dell Products L.P., Round Rock, TX (US)

(72) Inventors: Gregory W. Lazar, Upton, MA (US); Vasudevan Subramanian, Chapel Hill, NC (US); Weixing Wang, Durham, NC (US); Animesh Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/225,787

(22) Filed: Jul. 25, 2023

(65) Prior Publication Data

US 2025/0039087 A1  Jan. 30, 2025

(51) Int. Cl.
*H04L 45/741* (2022.01)
*G06F 11/14* (2006.01)
*H04L 45/745* (2022.01)

(52) U.S. Cl.
CPC ........ *H04L 45/741* (2013.01); *G06F 11/1464* (2013.01); *H04L 45/745* (2013.01)

(58) Field of Classification Search
CPC ................ H04L 45/741; H04L 45/745; G06F 11/1464
See application file for complete search history.

(56) References Cited

U.S. PATENT DOCUMENTS

| 7,995,571 | B2 | 8/2011 | Park | |
|---|---|---|---|---|
| 2012/0072763 | A1* | 3/2012 | Lu | G06F 16/183 707/704 |
| 2015/0254088 | A1* | 9/2015 | Chou | H04L 67/1097 718/1 |
| 2025/0030663 | A1* | 1/2025 | Ding | H04L 63/029 |

* cited by examiner

*Primary Examiner* — Farzana B Huq
(74) *Attorney, Agent, or Firm* — BainwoodHuang

(57) ABSTRACT

A distributed data storage system includes clusters of data storage appliances interconnected by an inter-cluster (IC) network having an IC namespace. Storage processing (SP) nodes exchange management traffic using mesh network (MN) addresses of a separate MN namespace. Gateways provide IC tunnels for routing management traffic among the clusters using IC network addresses. Operation includes, in each gateway for traffic from a local SP node destined for a remote SP node of another cluster, (1) performing a routing check based on a routing rule associating an MN destination address with a dummy MN address further associated with a respective IC tunnel, (2) applying a tunnel configuration rule of the IC tunnel associating the MN destination address with the IC network address of a remote gateway for the remote SP, and (3) forwarding the traffic on the respective IC tunnel using the IC network address of the remote gateway.

14 Claims, 4 Drawing Sheets

DISTRIBUTED DATA STORAGE SYSTEM WITH TUNNELING OF MANAGEMENT REQUESTS AMONG SCALE-OUT CLUSTERS

BACKGROUND

The invention is related to the field of data storage systems, and in particular to distributed data storage systems employing geographically separated clusters of data storage appliances for disaster recovery or similar data protection.

SUMMARY

A distributed data storage system includes a number of clusters of data storage appliances, with the clusters being interconnected by an inter-cluster (IC) network having an associated IC namespace. The data storage appliances have respective storage processing (SP) nodes exchanging management traffic using respective mesh network (MN) addresses defined in an MN namespace and not routable in the IC network. The clusters include respective gateways that are co-configured to provide IC tunnels among the clusters using network addresses of the IC namespace and to route the management traffic among the clusters using the IC tunnels. The routing operation includes, in each gateway for management traffic received from a local SP node destined for a remote SP node of another cluster, (1) performing a routing check based on a routing rule associating a valid MN-namespace destination address with a dummy MN-namespace address further associated with a respective IC tunnel, (2) applying a tunnel configuration rule of the IC tunnel associating the valid MN-namespace destination address with the IC-namespace network address of a remote gateway via which the remote SP is reached, and (3) forwarding the received traffic on the respective IC tunnel using the IC-namespace network address of the remote gateway. The use of the tunnel can provide various advantages such as reducing the number of public network addresses required while still maintaining mesh connectivity among the nodes.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

The disclosed technique may be used in various distributed-storage environments, including for example in systems deploying multiple instances of software-defined network-attached storage (SDNAS) components along with replication or other disaster recovery (DR) functionality. To support or other data protection functionality such as data volume replication in multi-instance SDNAS systems, in conventional use each SDNAS instance has a user provided network address for mesh connectivity to other SDNAS instances on a Disaster Recovery (DR) site. The SDNAS mesh connections are used for various management operations in a replication scenario, including for example when a SDNAS instance on one site needs to pass messages for snapshot schedules or for replication failover to an SDNAS instance on another site. These connections are typically not used very actively and may require only a small amount of network bandwidth. However, this address requirement may be a usability issue, and any changes in the network address subnet or allocation on either replication site requires a management operation to re-create the mesh connection.

In order to limit the requirement on having a large number of public IP addresses, while also providing desired security between cluster networks and seamless connectivity for applications with no rework being required, an inter-cluster tunnel (e.g., IPSEC tunnel) is leveraged. This tunnel provides connectivity between clusters while allowing for pre-provisioned private network addresses (e.g., IPv6) to be used as the source and destination, as opposed to requiring additional public network addresses (e.g., IPv4) for each node. A designated node (by default the Master controlplane (CP) node) in the cluster acts as the IPSEC gateway for the tunnel, which houses the externally facing tunnel network address and is used to send SDNAS management traffic from one cluster to another. In deployments where the originator of the traffic is using one version of IP (i.e. IPv6), and the tunnel endpoint is using another (i.e. IPv4, may be typical in customer networks), some special routing and namespace configuration requirements may also be used to make this solution work, as detailed below.

The following are potential advantages of the disclosed technique:
- Reduce the number of public IP addresses required while still maintaining mesh connectivity.
- Existing applications can run as is where the application is unaware of the tunneling from cluster to cluster.
- VPN gateways provide confidentiality as well as authentication (e.g., IKEv2)
- The use of namespaces and an IP address to accommodate the routing check when the IP protocol version differs in the node and gateway.

Embodiments

Figure 1:
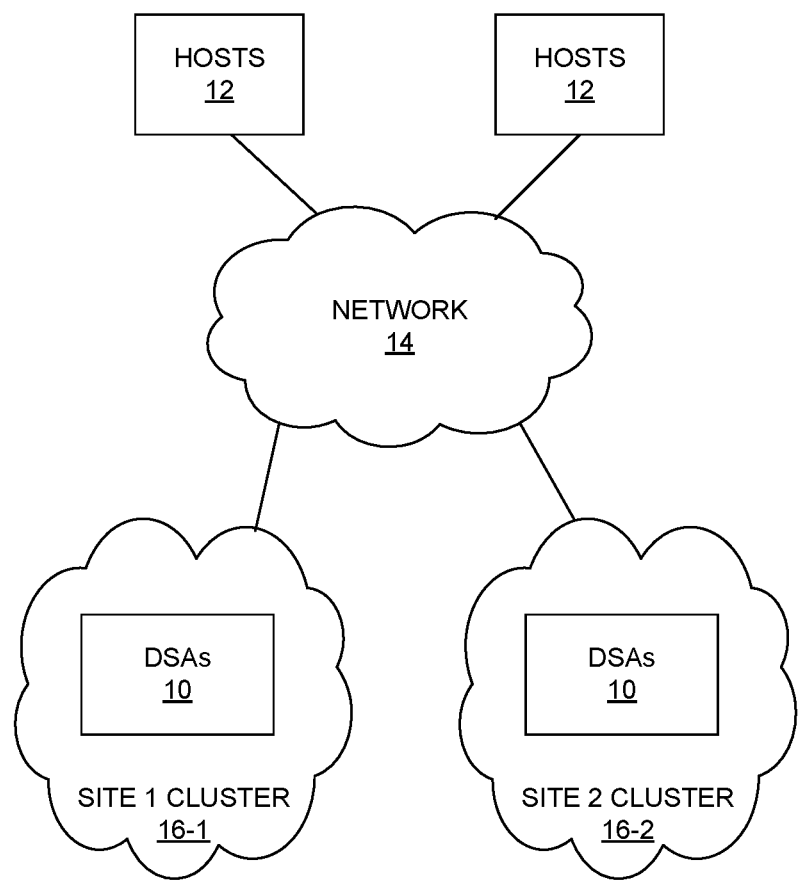
FIG. 1 is a block diagram of a distributed data storage system.

FIG. 1 shows a data processing system having a number of data storage appliances (DSAs) 10 coupled to host computers (Hosts) 12 via a network 14. The DSAs 10 provide persistent secondary storage using storage devices such as magnetic disks, Flash memory, etc. As shown, the DSAs 10 are distributed among two or more geographically distinct locations or sites, e.g., two sites Site 1 and Site 2 as shown. Also as indicated, at each site the DSAs 10 are organized into one or more "clusters", which are sets of more tightly coupled DSAs 10 as generally known in the art. The present description assumes a non-limiting example of two single-cluster sites, with the clusters identified as Site 1 cluster 16-1 and Site 2 cluster 16-2 (which are also referred to for convenience below as "site 16-1" and "site 16-2"). Those skilled in the art will appreciate the ability to generalize to multiple-cluster sites.

As noted, the DSAs 10 provide persistent secondary storage using storage devices such as magnetic disks, Flash memory, etc. Each DSA 10 has an internal structure generally including front-end interface circuitry for interfacing to the hosts 12, back-end interface circuitry for interfacing to the local storage devices, and storage processing circuitry that executes storage system software to provide data storage functionality both at a virtual or logical level (e.g., logical and virtual storage devices) as well as at a lower physical level (e.g., physical storage of data on the storage devices). Details of relevant data storage functionality are described further below.

Figure 2:
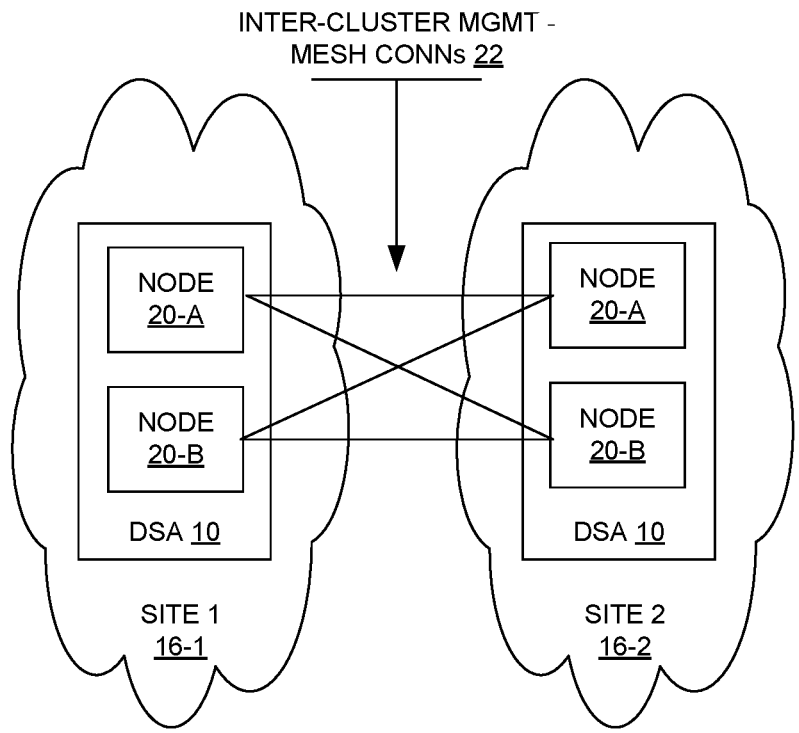
FIG. 2 is a block diagram of certain aspects of a distributed data storage system in additional detail.

FIG. 2 illustrates additional important details of the distributed storage system. Each DSA 10 is shown as including two separate storage processing nodes 20-A, 20-B. As generally known, the nodes 20 of a DSA 10 operate both independently and somewhat inter-dependently, i.e., during normal operation they may handle separate workloads largely independently, but they also implement protection functionality that enables one node 20 to assume the workload of the other node 20 in the event of a failure, for example. Additionally, the DSAs 10 implement a wider-area protection technique referred to as "disaster recovery" or DR that requires coordination across the two sites 16, with site 16-2 serving as a DR site for site 16-1, for example. Part of the DR functionality is provided using a full mesh set of communications connections among the nodes 20 across the two sites 16. These are shown as inter-cluster management (MGMT) mesh connections 22. In this simplified example, there is a direct connection 22 between each node 20 at a given site 16 and each of the two nodes 20 at the other site 16. As noted above, this example assumes single-cluster sites. In a more general case involving more than two clusters across a set of sites 16, there are respective sets of management mesh connections 22 among each pair of clusters.

Thus in the system of FIG. 2, the DSA 10 at site 16-1 may be replicating to a DSA 10 at site 16-2, and more particularly this replication is occurring between respective instances of software-defined network-attached storage (SDNAS) running on each node 20. The mesh connections 22 are used for SDNAS replication, namely various management operations that include scenarios in which an SDNAS instance on site 16-1 needs to pass messages for snapshot schedules or for replication failover to the SDNAS instances on the remote site 16-2. These connections 22 may not be used very actively and thus may require only a small amount of network bandwidth.

It will be appreciated that each individual connection 22 requires a pair of network addresses for each endpoint, thus in general a large number of distinct endpoint addresses may be required to support the DR communications scheme in a real-world system having a much larger number of DSAs 10 distributed across a number of clusters and sites 16. It would be possible for the network 14 (FIG. 1) to directly support the mesh connection by providing all the required network addresses for the endpoints of all the connection 22, with such addresses being fully "routable", i.e., addresses that are recognized and correctly processed for routing by network routers of the network 14. Such addresses are also referred to herein as "public", i.e., being part of and administered by the separate network 14 rather than having a scope more limited to a cluster at an individual site 16 for example. However and as noted above, the need for these public addresses can be a usability issue, both in terms of scale (desire to support more DSAs 10 and clusters across more sites 16, requiring large numbers of addresses) and in terms of operational burden-any changes in the address subnet or allocation at a replication site 16 requires a management operation to re-create the mesh connection at least in part or even entirely.

In order to avoid the need for a large number of public network addresses, while also providing desired security between cluster networks and seamless connectivity for applications with no rework being required, the presently disclosed technique employs one or more network tunnels, e.g., IPSEC tunnels, between sites 16 to convey SDNAS management traffic from one cluster 16 to another. Each tunnel provides connectivity between clusters that enables the nodes 20 to use pre-provisioned private network addresses for the mesh connections 22, as opposed to requiring additional public network addresses for each node. A designated node (e.g., a master control plane (CP) node) in each cluster 16 can act as an IPSEC gateway for the tunnel. The technique can also support deployments in which the nodes 20 are using one network protocol and associated network address space (e.g., Internet Protocol v6 or IPv6) while the public network 14 between sites 16 uses another protocol and address space (e.g., IPv4), with provision of certain routing and namespace configuration details as described more below.

Figure 3:
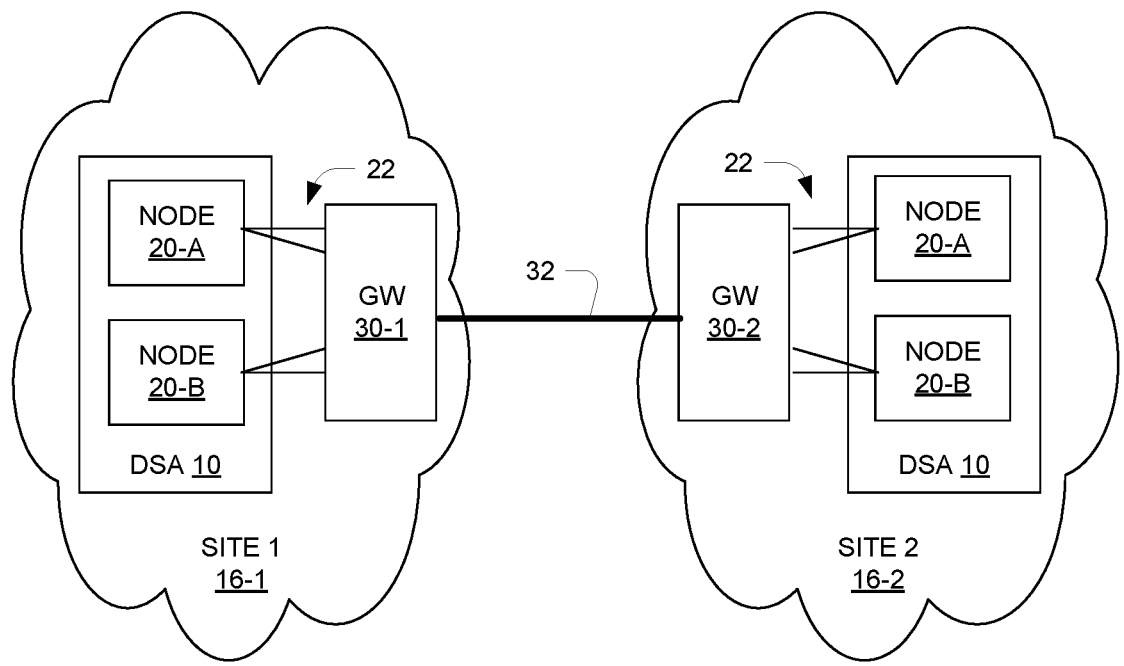
FIG. 3 is a block diagram of a distributed data storage system employing gateways and an inter-cluster tunnel for carrying traffic among geographically separated storage nodes.

FIG. 3 illustrates a suitable arrangement in one embodiment. As noted, each site 16 includes a respective gateway (GW) 30 (30-1, 30-2) which terminates a corresponding end of a tunnel 32 (e.g., an IPSEC tunnel) at an external-facing port. Although not shown, it will be understood that the tunnel 32 is itself carried in a public inter-cluster network interconnecting the clusters 16. The GWs 30 may also be referred to herein as "VPN gateways" (where VPN refers to virtual private network), based on their function of making remote devices (e.g., nodes 20 at a remote site 16) appear to be located on the same local private network as a local node 20. Within a site 16, each GW 30 terminates respective ones of the mesh connections 22 from the local nodes 20, and carries all traffic of the connections 22 over the tunnel 32. In one embodiment, the tunnel 32 may be realized as an IPSEC tunnel. The traffic of the connections 22 is carried as a set of distinct streams within the tunnel 32, each stream corresponding to a respective inter-node connection 22. Additional details of operation are described below.

Routing

For traffic to reach a local gateway 30, be tunneled to a remote site 16, and reach the appropriate endpoint node 20, overall routing must be configured properly. Traffic is routed from an originating node 20 to a private address of a local VPN GW 30. From there, IPSEC policies are applied, based on the source and destination network, to protect the traffic which is to be carried via the VPN tunnel 32. Prior to the policies being applied (e.g., by an IPSEC state machine), there is a routing step that is satisfied, which may be part of a separate IP state machine within the operating software of the gateway 30. If the endpoint nodes 20 and tunnel IP protocol versions are the same (e.g., IPV6 and IPV6), then the routing address may be simply the address of the remote end of the IPSEC tunnel 32. However, one feature of the disclosed technique is its ability to work in mixed-protocol arrangements wherein the public, inter-cluster network uses a protocol different from that used within each cluster 16. In such uses, the routing rules cannot contain network addresses of different versions or protocols (e.g., IPv4 and IPV6), so the route endpoint must be a reachable address of the same type as the originating node. An address may be used that is not sent any network traffic, but rather simply used to satisfy a routing check. Additionally, the route must be housed in an alternate network namespace from the address that received the traffic on the VPN GW 30, so a network namespace is specifically provisioned to house this route check address. An additional namespace is required as the route destination cannot, by rule, exist in the same namespace as the source.

Figure 4:
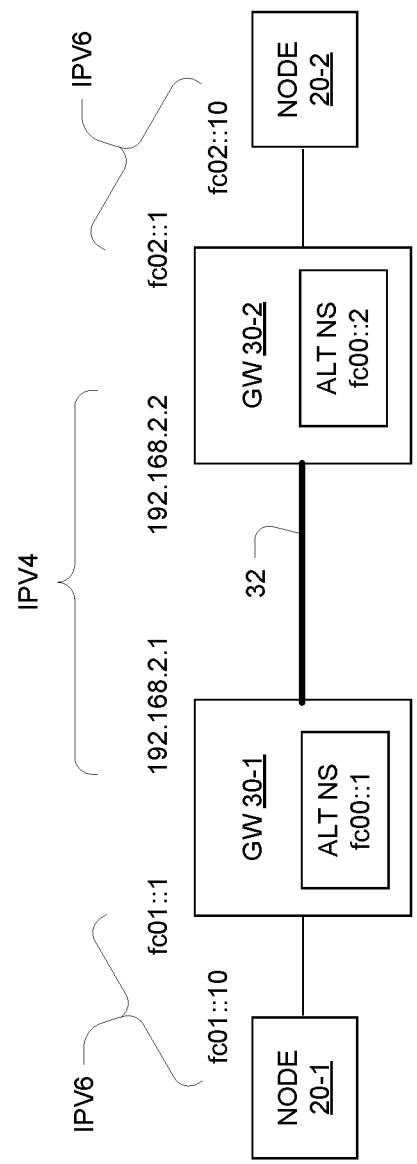
FIG. 4 is a schematic diagram of end-to-end communications including endpoint and intermediate network addresses.

FIG. 4 shows an example of originating/endpoint nodes 20 using IPv6 addresses (fc01::10, fc02::10 as shown), while the external/public tunnel endpoints use IPv4 addresses (192.168.2.1, 192.168.2.2 as shown). Each gateway 30 uses an additional pair of IPV6 addresses, one as an endpoint of the connection to the local node 20 (e.g., fc01::1, fc02:;1 as shown) and the other being a special address in an alternative namespace (ALT NS) (fc00::1, fc00::2 as shown). An alternative namespace is used so as to avoid routing loops that might occur otherwise. The following are the applicable routing rules associated with each node for this solution.

Node 20-1: ip route add fc02::/16 via fc01::1
Node 20-2: ip route add fc01::/16 via fc02::1
GW 30-1: ip route add fc02::/16 via fc00::1
GW 30-2: ip route add fc02::/16 via fc00::2

One key aspect of the above is the use of the special or "dummy" namespace address fc00. If the tunnel 32 were an IPV6 tunnel then this would not be necessary, and instead the address could be the public IPV6 address of the corresponding tunnel endpoint. But in this example having an IPv4 tunnel, the IPV6 routing rules cannot accommodate an IPV4 address, and thus the dummy address is used to satisfy the routing check.

The routing rule for node 20-1 as an example routes any traffic, destined for the fc02 subnet (remote site 16-2), to the address fc01::1 for the local gateway 30-1. From there the IP state machine on GW 30-1 performs a routing check on the next route destination, fc00::1, to ensure it is a valid/reachable address via the routing check. If that check passes, the rules associated with the VPN configuration (e.g., Strongswan, see below) are applied, where traffic initiated by a node in the fc01 network destined for fc02, and vice versa, are encrypted and sent through the tunnel 32 between the 192.168.2.x public endpoints.

---

Strongswan VPN configuration (IPSEC VPN GW 30-1)

---

```
connections {
  net-net {
    local_addrs = 192.168.2.1      'local tunnel endpoint
    remote_addrs = 192.168.2.2     'remote tunnel endpoint
    local {
      auth = pubkey
      certs = moonCert.pem
      id = GW1.foo.com
    }
    remote {
      auth = pubkey
      id = GW2.foo.com
    }
    children {
      net-net {
        local_ts = fc01::0/16      'local traffic selector, identifies fc01
        remote_ts = fc02::0/16     'remote traffic selector, identifies
                                    fc02
        updown = /usr/local/libexec/ipsec/_updown iptables
        esp_proposals = aes128-sha256-x25519
      }
    }
    version = 2
    mobike = no
    proposals = aes128-sha256-x25519
  }
}
```

---

Figure 5:
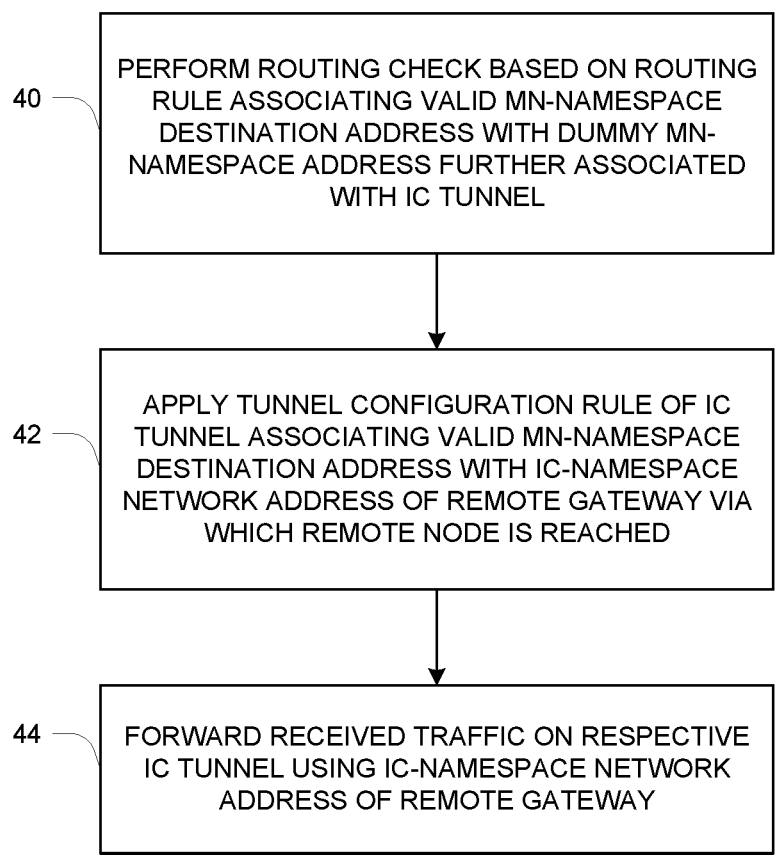
FIG. 5 is a flow diagram of inter-cluster communication operation.

FIG. 5 is a flow diagram of key operation (e.g., of gateway 30) in a distributed data storage system such as disclosed herein, i.e., a system having a plurality of clusters of data storage appliances, in which the clusters are interconnected by an inter-cluster (IC) network having an associated IC namespace (e.g., an IPv4 address space), while the data storage appliances have respective storage processing (SP) nodes exchanging management traffic using respective mesh network (MN) addresses defined in an MN namespace (e.g., an IPV6 address space) and not routable in the IC network. Referring briefly back to FIG. 4, all addresses of the form fc*::* are examples of mesh network addresses, while the two addresses of the form 192.168.*.* are examples of IC network addresses.

The clusters include respective gateways being co-configured and co-operative to provide IC tunnels among the clusters using network addresses of the IC namespace and to route the management traffic among the clusters using the IC tunnels. The routing is performed in each gateway for management traffic received from a local SP node destined for a remote SP node of another cluster.

The routing operation includes, at step 40 of FIG. 5, performing a routing check based on a routing rule associating a valid MN-namespace destination address with a dummy MN-namespace address further associated with a respective IC tunnel. At step 42, the process applies a tunnel configuration rule of the IC tunnel associating the valid MN-namespace destination address with the IC-namespace network address of a remote gateway via which the remote SP is reached. At step 44, the received traffic is forwarded on the respective IC tunnel using the IC-namespace network address of the remote gateway.

It will be appreciated that the gateways include mirroring functionality for traffic flowing the other direction, i.e., traffic received from a remote SP node via the IC tunnel, destined for a local SP node. In reverse direction, setup and operation are similar, i.e., all of the routes, dummy namespace, etc., are set up in the same manner to allow traffic in the reverse direction (responses sent to originating SP node.

While various embodiments of the invention have been particularly shown and described, it will be understood by those skilled in the art that various changes in form and details may be made therein without departing from the scope of the invention as defined by the appended claims.

What is claimed is:

1. A distributed data storage system comprising a plurality of clusters of data storage appliances, wherein:

the clusters are interconnected by an inter-cluster (IC) network having an associated IC namespace, the data storage appliances include (1) respective storage devices providing persistent secondary data storage and (2) respective internal structure including front-end interface circuitry for interfacing to host computers, back-end interface circuitry for interfacing to the storage devices, and storage processing circuitry including respective storage processing (SP) nodes, the SP nodes of the data storage appliances being configured and operative to exchange management traffic using respective mesh network (MN) addresses defined in an MN namespace and not routable in the IC network, and the clusters include respective gateway devices being co-configured and co-operative to provide IC tunnels among the clusters using network addresses of the IC namespace and to route the management traffic among the clusters using the IC tunnels, by, in each gateway device for management traffic received from a local SP node destined for a remote SP node of another cluster, (1) performing a routing check based on a routing rule associating a valid MN-namespace destination address with a dummy MN-namespace address further associated with a respective IC tunnel, (2) applying a tunnel configuration rule of the IC tunnel associating the valid MN-namespace destination address with the IC-namespace network address of a remote gateway device via which the remote SP is reached, and (3) forwarding the received traffic on the respective IC tunnel using the IC-namespace network address of the remote gateway device, wherein the clusters are located at respective geographically separated sites, and the management traffic is traffic for a disaster recovery protection scheme implemented between the sites, and wherein the IC tunnel is realized as an Internet Protocol Security (IPSEC) tunnel, and wherein each gateway device is further configured and operative to provide one or more additional IPSEC functions in connection with the IPSEC tunnel, the functions selected from encryption and endpoint authentication.

2. The distributed data storage system of claim 1, wherein the IC network uses an IC network protocol different from an MN network protocol used by the SP nodes, the protocol difference causing the non-routability of the MN addresses in the IC network.

3. The distributed data storage system of claim 2, wherein the IC network protocol is Internet Protocol version 4, and the MN network protocol is Internet Protocol version 6.

4. The distributed data storage system of claim 1, wherein each SP node is configured and operative to realize a corresponding instance of software-defined network-attached storage (SDNAS), and each SDNAS instance at one site are paired with one or more SDNAS instances at another site to provide disaster recovery protection.

5. The distributed data storage system of claim 4, wherein the management traffic is for management operations in a replication scenario, including an SDNAS instance on one site passing messages for snapshot schedules and/or for replication failover to an SDNAS instance on another site.

6. The distributed data storage system of claim 4, wherein each SDNAS instance has a user provided MN address for mesh connectivity to the SDNAS instances on the other site.

7. A method of exchanging management traffic among storage processing (SP) nodes of respective clusters of data storage appliances, comprising:

Interconnecting the clusters by an inter-cluster (IC) network having an associated IC namespace;

by the data storage appliances, (1) using respective storage devices to provide persistent secondary data storage and (2) using (a) respective front-end interface circuitry for interfacing to host computers, (b) respective back-end interface circuitry for interfacing to the storage devices, and (c) respective SP nodes of storage processing circuitry, the SP nodes using respective mesh network (MN) addresses defined in an MN namespace and not routable in the IC network; and operating respective gateways of the clusters to provide IC tunnels among the clusters using network addresses of the IC namespace and to route the management traffic among the clusters using the IC tunnels, by, in each gateway for management traffic received from a local SP node destined for a remote SP node of another cluster:

performing a routing check based on a routing rule associating a valid MN-namespace destination address with a dummy MN-namespace address further associated with a respective IC tunnel;

applying a tunnel configuration rule of the IC tunnel associating the valid MN-namespace destination address with the IC-namespace network address of a remote gateway via which the remote SP is reached; and forwarding the received traffic on the respective IC tunnel using the IC-namespace network address of the remote gateway, wherein the clusters are located at respective geographically separated sites, and the management traffic is traffic for a disaster recovery protection scheme implemented between the sites, and wherein the IC tunnel is realized as an Internet Protocol Security (IPSEC) tunnel, and wherein each gateway device is further configured and operative to provide one or more additional IPSEC functions in connection with the IPSEC tunnel, the functions selected from encryption and endpoint authentication.

8. The method of claim 7, wherein the IC network uses an IC network protocol different from an MN network protocol used by the SP nodes, the protocol difference causing the non-routability of the MN addresses in the IC network.

9. The method of claim 8, wherein the IC network protocol is Internet Protocol version 4, and the MN network protocol is Internet Protocol version 6.

10. The method of claim 7, wherein each SP node is configured and operative to realize a corresponding instance of software-defined network-attached storage (SDNAS), and each SDNAS instance at one site are paired with one or more SDNAS instances at another site to provide disaster recovery protection.

11. The method of claim 10, wherein the management traffic is for management operations in a replication scenario, including an SDNAS instance on one site passing messages for snapshot schedules and/or for replication failover to an SDNAS instance on another site.

12. The method of claim 10, wherein each SDNAS instance has a user provided MN address for mesh connectivity to the SDNAS instances on the other site.

13. The distributed data storage system of claim 1, wherein the local SP node uses a first routing rule associating the valid-MN-namespace destination address with a local MN-namespace address of the IC tunnel, and wherein the gateway device for the local traffic from the local SP node uses (1) for a routing check to ensure reachability of the remote SP node, a second routing rule associating the valid-MN-namespace destination address with the dummy MN-namespace address, and (2) for the applying and forwarding steps, additional rules associated with a VPN configuration to send the traffic through the tunnel using the IC-namespace network address as an endpoint address.

14. The distributed data storage system of claim 1, wherein the local SP node uses a first routing rule associating the valid-MN-namespace destination address with a local MN-namespace address of the IC tunnel, and wherein the gateway for the local traffic from the local SP node uses (1) for a routing check to ensure reachability of the remote SP node, a second routing rule associating the valid-MN-namespace destination address with the dummy MN-namespace address, and (2) for the applying and forwarding steps, additional rules associated with a VPN configuration to send the traffic through the tunnel using the IC-namespace network address as an endpoint address.

* * * * *